United States Patent [19]

Bradley

[11] 4,094,213
[45] June 13, 1978

[54] COMBINED WIRE CUTTER AND INSULATION REMOVER

[75] Inventor: Marion W. Bradley, Magalia, Calif.
[73] Assignee: Farinon Electric, San Carlos, Calif.
[21] Appl. No.: 597,238
[22] Filed: Jul. 18, 1975
[51] Int. Cl.² .............................................. H02G 1/12
[52] U.S. Cl. .................................................. 81/9.5 R
[58] Field of Search ................ 81/9.5 R, 9.5 C, 9.5 B, 81/43, 9.5 A; 30/90.1, 91.2; 29/751, 753, 761; 72/412, 411

[56] References Cited

U.S. PATENT DOCUMENTS

| | | | |
|---|---|---|---|
| 2,386,328 | 10/1945 | Rollings | 81/9.5 R |
| 2,889,728 | 6/1959 | Hindenburg | 81/9.5 A |
| 2,894,424 | 7/1959 | Vaughan | 81/9.5 R |
| 3,151,509 | 10/1964 | Gormley | 81/9.5 R |
| 3,532,011 | 10/1970 | Bradley | 81/9.5 C |

FOREIGN PATENT DOCUMENTS 1,324,321  7/1973  United Kingdom ............... 81/9.5 R Primary Examiner—James L. Jones, Jr.
Assistant Examiner—Roscoe V. Parker
Attorney, Agent, or Firm—William C. Babcock

[57] ABSTRACT

A lightweight, portable device that in one operation cuts an end portion of wire to a predetermined length, severs a tough resilient sheath of electrical insulating material therefrom, and slides the severed sheath of electrical insulating material from the wire to expose a bare electrical conductor of a predetermined length.

1 Claim, 5 Drawing Figures

U.S. Patent   June 13, 1978   4,094,213
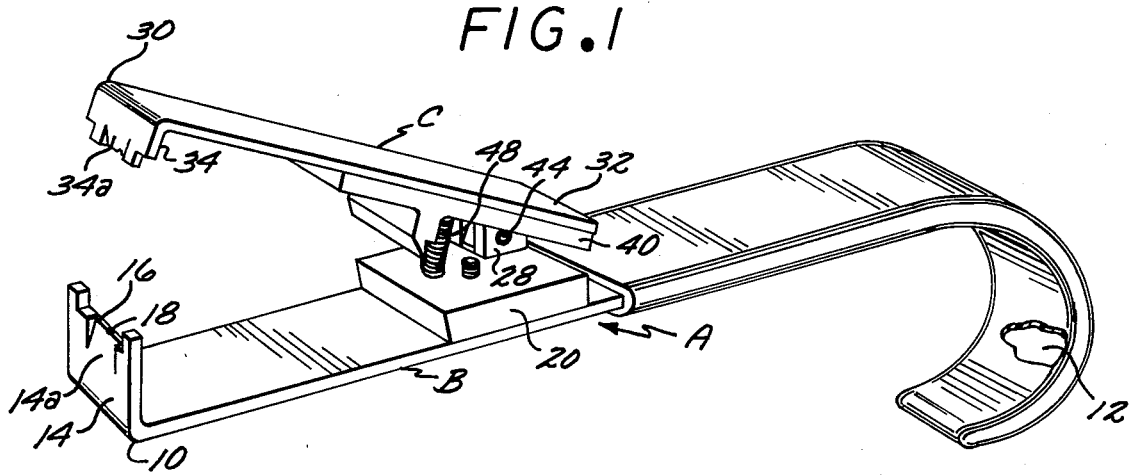
FIG.1
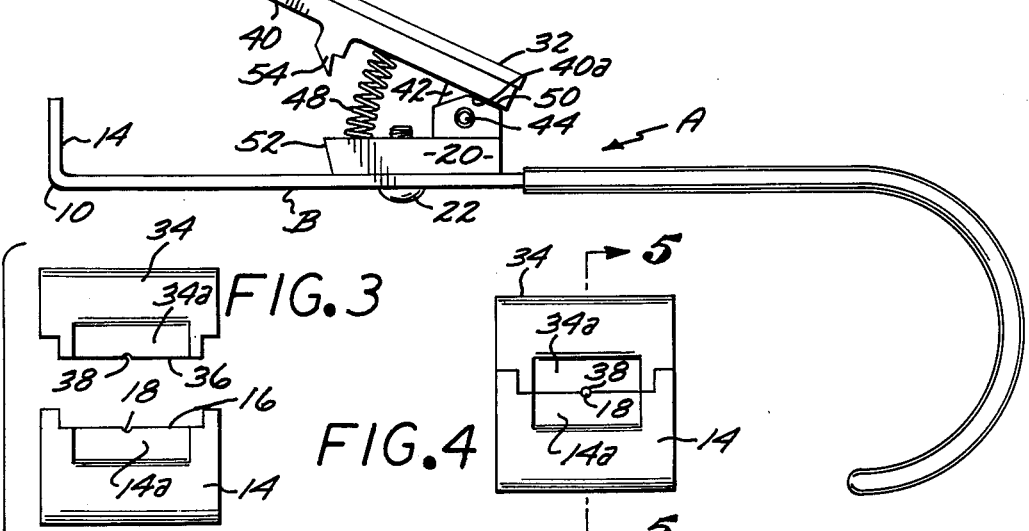
FIG.2
FIG.3
FIG.4
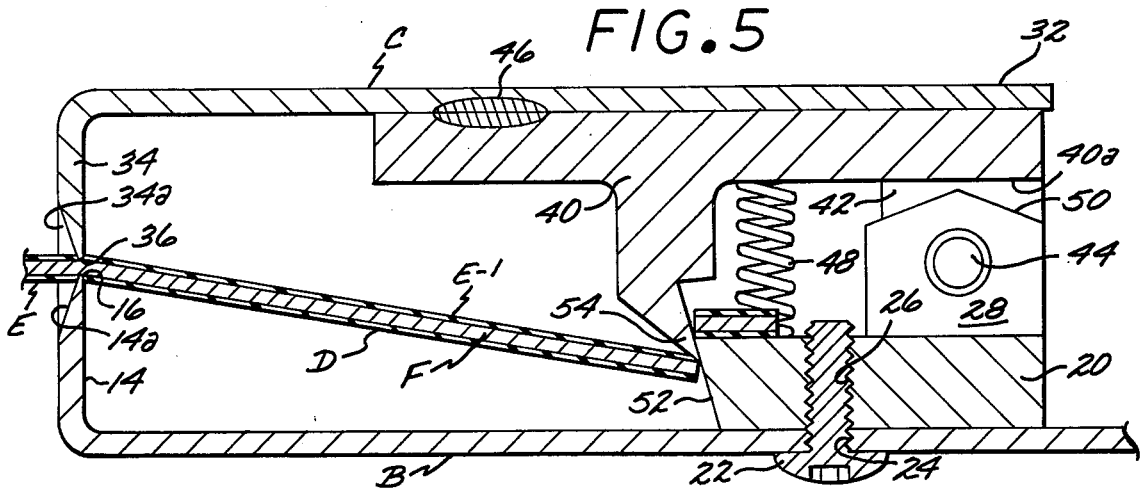
FIG.5

COMBINED WIRE CUTTER AND INSULATION REMOVER

BACKGROUND OF THE INVENTION

1. Field of the Invention

Combined Wire Cutter and Insulation Remover.

2. Description of the Prior Art

In recent years, wire has been manufactured that has an extremely tough, resilient sheath of electrical insulating material enveloping the electrical conductor. The cutting and removing of a section of this sheath to bare an end portion of the electrical conductor is difficult with prior art wire stripping devices.

The present invention overcomes the operational disadvantages of prior wire strippers by providing a device that permits a complete circumferential severance of a thin longitudinal wall section of the insulating sheath from the balance thereof, and by appropriate movement of the device the severed sheath portion is removed from an end portion of the wire. The present invention as it severs an end portion of a sheath of insulating material of a desired length from the wire, also cuts the wire to provide a bare end portion of the electrical conductor that is of a desired length when the sheath of electrical insulating material that previously enveloped the same is slid therefrom by use of the present invention.

A major object of the present invention is to supply a lightweight portable device that is adapted to cut an end portion of wire to a predetermined length, and then by combined compression and tensioning forces severing an end portion of the electrical insulating sheath that previously enveloped the conductor to be removed therefrom, and this operation resulting in the baring of a predetermined length of the electrical conductor.

SUMMARY OF THE INVENTION

A lightweight portable device that in one operation cuts an end portion of wire to a predetermined length, and strips a sheath of electrical insulating material that is tough and resilient therefrom to expose a predetermined length of the electrical conductor previously enveloped by the sheath.

The device includes a first elongate rigid member that has a first end and second end portion, with the second end portion being in the form of a hook, and a first pressure exerting extension on the first end thereof that is substantially normally disposed to the first member. The first extension has a free transverse first edge surface of substantial width in which a first longitudinally aligned semi-cylindrical groove is defined that has a radius slightly greater than that of the electrical conductor.

The device also includes a second elongate rigid member that has a first end and second end portion, with the second member having a second pressure exerting extension on the first end thereof that is substantially normally disposed to the second member. The second extension has a free transverse second edge surface of substantial width in which a second longitudinally aligned semi-cylindrical groove is defined that has a radius slightly greater than that of the electrical conductor. The device includes first means that pivotally support the second member in overlying relationship with the first member. First and second blades are disposed in fixed positions relative to the first and second members, with these members being utilized for cutting an end portion of the wire to a predetermined length prior to stripping of the sheath from the electrical conductor.

A compressed spring is provided that at all times tends to maintain the first and second members in a first position where the first and second grooves are aligned in a common plane, and the first and second blades are separated by first and second distances that are greater than the diameter of the wire. The spring permits the first and second members to be pivoted to a second position where the first and second edge surfaces defining the first and second grooves compress a short longitudinal section of the sheath of electrical insulating material to define a thin cylindrical wall that may be severed when the device is moved relative to the wire in a direction to tension the section. Continued movement of the device after tensioning the compressed wall section results in the breaking of the section, and the subsequent sliding of the severed sheath portion from the conductor. Prior to the severance of the sheath portion above described, the first and second blades cut surplus wire from the end portion thereof that has the sheath of insulating material stripped therefrom, and as a result when the insulating material is stripped from the wire a bared portion of the electrical conductor is provided that is of a desired predetermined length.

BRIEF DESCRIPTION OF THE DRAWING

FIG. 1 is a perspective view of the combined wire cutter and insulation stripper;

FIG. 2 is a side elevational view of the device shown in FIG. 1;

FIG. 3 is an end elevational view of the first and second pressure exerting extensions in a first open position;

FIG. 4 is the same view as shown in FIG. 3 with the first and second pressure exerting extensions in a second closed position;

FIG. 5 is a longitudinal cross sectional view of the device shown in FIG. 1, with the second elongate rigid member thereof in a second position in which a longitudinal section of the insulation material is compressed to a thin cylindrical wall to permit the stripping of an end portion of the insulation from the electrical conductor after the wall has been tensioned above the breaking point thereof, and illustrating a surplus end section of the wire has been severed therefrom by first and second knives that form a part of the device.

DESCRIPTION OF THE PREFERRED EMBODIMENT

The combined wire cutter and insulation remover invention A is shown in FIGS. 1, 2 and 5 and includes a first elongate rigid member B and second elongate rigid member C that is pivotally connected thereto. The invention A may be used on wire D to remove a predetermined length of a sheath of insulating material E therefrom to expose a predetermined length of the bare electrical conductor F when the device is used as shown in FIG. 5.

The first elongate rigid member B includes a first end 10 and second end portion 12, with the second end portion being of generally curved configuration. A first pressure exerting extension 14 extends from the first end 10 and is substantially normally disposed relative to the first elongate member B. The first extension 14 has a first transverse edge surface 16 of substantial width, in which a first semi-cylindrical groove 18 is formed. First groove 18 has a radius slightly greater than that of conductor F. The first groove 18 is parallel to the longitudinal axis of first member B.

A first rigid block 20 is secured to the first member B intermediate the first end and second end portion 12 thereof as shown in FIG. 2 by a screw 22 or other suitable fastening means. When the screw 22 is used it engages a tapped bore 24 formed in the first member B and an aligned tapped bore 26 formed in the first block 20. The first block 20 has a pair of laterally spaced arms projecting outwardly therefrom as may be seen in FIG. 2.

The second elongate rigid member C includes a first end 30 and second end portion 32. A second pressure exerting extension 34 projects from the first end 30 and is substantially normally disposed to the second rigid member C. The second pressure exerting extension 34 includes a second transverse edge surface 36 in which a second semi-cylindrical groove 38 is formed of the same radius as first groove 18. The grooves 18 and 38 are longitudinally aligned when the first and second members B and C are in the second position shown in FIG. 5.

The second elongate member C has a second block 40 secured thereto. A second arm 42 projects from the second block 40 and is disposed between the pair of first arms 28. The first and second arms 28 and 42 are pivotally connected to one another by a pin 44 that extends through transversely aligned bores (not shown) formed in the first and second arms. The second block 40 is secured to the second elongate member C by a welding bead 46 as may be seen in FIG. 5.

A compressed helical spring 48 is provided that extends between the first and second block 20 and 40, and at all times tends to maintain the first and second elongate members B and C in a first position as shown in FIG. 2. The spring 48 is prevented from pivoting the second elongate member C beyond the first position due to a surface portion 40a of second block 40 contacting an angularly disposed face 50 formed on one of the first arms 28 as shown in FIG. 5.

The forward portion of the first block 20 is shaped to define a first blade 52, that is adapted to be slidably engaged by a second blade 54 that forms a part of the second block 40.

In using the invention A, an end portion of the wire D is extended between the first and second rigid members B and C when they are in the first position shown in FIG. 2, with the free end section of this portion of the wire D resting on the upper surface of the first block 20. The wire is disposed in the first groove 18. When the second elongate member is pivoted from the first position shown in FIG. 2 to that illustrated in FIG. 5, the semi-cylindrical groove 18 and 38 extend circumferentially around the sheath E of insulating material and form a short longitudinal section thereof into a thin compressed wall section that may be broken when tension is applied thereto. Breaking of this thin wall section of the insulation is achieved by moving the device A in a direction to tension the wall section and subsequently slide the severed end portion E-1 of the sheath of insulation from the conductor F. Prior to the end portion E-1 of the sheath being severed, the first and second blades 52 and 54 have moved to an overlapping position as shown in FIG. 5, and in so doing have severed a surplus end section D-1 of the wire D from the end portion of the wire that is having the insulation section E-1 stripped therefrom. When the portion E-1 of the electrical insulating material is slid from the conductor F that it previously enveloped, an end portion of the bare electrical conductor is provided that is of a predetermined length. Thus, when the device A is used, not only is the insulation material E-1 stripped from an end portion thereof, but the bared end portion of the conductor F that this insulation previously enveloped will be of a predetermined length, rather than allowing the length to be determined by the judgment of the user.

The use and operation of the invention has been described previously in detail and need not again be repeated.

I claim:

1. A device for stripping a cylindrical electrical insulating sheath that is formed from a highly resilient and compressible material from a wire to expose a bare end portion of the latter that is of predetermined length, said device being of the type that includes: first and second elongate rigid members that each have first and second end portions, said second member overlying said first member; pivot means that pivotally connect said first end portion of said second member to said first member intermediate said first and second end portions of the latter; spring means that at all times tend to maintain said second member in a first angular position relative to said second member, but permitting said second member to be pivoted to a second position where said second end portions of said first and second members lie in a common plane; first and second cutters disposed said predetermined length from said second end portions of said first and second members and so supported from said first and second members as to slidably engage one another as said second member moves from said first to said second position and in so doing cutting said insulation sheath and wire situated therebetween; first and second rigid extensions extending towards one another and defining said second end portions of said first and second rigid members, said first and second extensions including first and second transverse edges of substantial width that are separated by a distance greater than the diameter of said sheath when said second member is in said first position; with said device being characterized by first and second semi-cylindrical aligned recesses formed in said first and second transverse edges of said first and second extensions, said first and second recesses each having a diameter slightly larger than the diameter of said bare wire, and said first and second recesses being of sufficient widths that when said second member is moved to said second position, said first and second recesses compress a cylindrical section of said sheath therebetween to have such a thin wall that said thin wall may be broken and a portion of said sheath that has been cut to said predetermined length by said first and second cutters may be slid from an end portion of said wire that is also of said predetermined length by moving said device longitudinally relative to said wire in an appropriate direction with said second member in said second position; and first and second engageable means on said first and second extensions that slidably interlock to maintain said first and second recesses in alignment as said first and second recesses pressure contact said insulation sheath to form said thin wall cylindrical section.

* * * * *